United States Patent
Scotti et al.

(10) Patent No.: US 9,916,339 B2
(45) Date of Patent: Mar. 13, 2018

(54) EFFICIENT SORTING IN A RELATIONAL DATABASE

(71) Applicant: INTERNATIONAL BUSINESS MACHINES CORPORATION, Armonk, NY (US)

(72) Inventors: Alessandro Scotti, Rome (IT); Luca Lazzaro, Rome (IT); Leonardo Lanni, Rome (IT); Francesco Carteri, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 14/896,028

(22) PCT Filed: May 22, 2014

(86) PCT No.: PCT/IB2014/061615
§ 371 (c)(1),
(2) Date: Dec. 4, 2015

(87) PCT Pub. No.: WO2014/195818
PCT Pub. Date: Dec. 11, 2014

(65) Prior Publication Data
US 2016/0132544 A1    May 12, 2016

(30) Foreign Application Priority Data
Jun. 7, 2013    (IT) ............... MI2013A0940

(51) Int. Cl.
*G06F 17/00* (2006.01)
*G06F 17/30* (2006.01)

(52) U.S. Cl.
CPC .. *G06F 17/30339* (2013.01); *G06F 17/30595* (2013.01)

(58) Field of Classification Search
CPC ...... G06F 17/28; G06F 3/0482; G06F 17/277; G06F 17/2785; G06F 17/3053; G06F 17/30684
See application file for complete search history.

(56) References Cited

FOREIGN PATENT DOCUMENTS

JP    2010271998 A    12/2010
WO    2009019930 A1    2/2009
(Continued)

OTHER PUBLICATIONS

International Search Report for PCT/IB2014/061615 dated Jul. 29, 2014.

*Primary Examiner* — Truong Vo
(74) *Attorney, Agent, or Firm* — Richard Wilhelm, Esq.; Kevin P. Radigan, Esq.; Heslin, Rothenberg, Farley & Mesiti, P.C.

(57) ABSTRACT

The present invention relates to a method, computer program product and system to compute one sorted list of enumeration values in a specific language, read from at least one relational database including at least one data table storing enumeration programming variable values and at least one catalog table storing an expression, in at least one language, of the enumeration programming variable values, said method comprising the steps of receiving a request for providing enumeration variable values including one list sorted in a specific order, of the values of a specific enumeration, in a specific language; then, all the expressions of the enumeration values for the specific language for the specific enumeration read in a corresponding catalog table are sorted in the specific order; if the sorted list of the specific enumeration expression values matches a list of the specific enumeration variable values sorted in the specific order in the same catalog table, the sorted list of enumeration values in a specific language is created from this ordered catalog table; if in the preceding step the match was not (Continued)

found, if the sorted list of the specific enumeration expressions values matches a list of the specific enumeration variable values sorted in the reverse order from the specific order in the same catalog table, the sorted list of enumeration values in a specific language is created from the sorted catalog table; if in any of the two preceding steps, the match was not found, a new table joined table is built from data and catalog table in the standard way.

15 Claims, 5 Drawing Sheets

(56) References Cited

FOREIGN PATENT DOCUMENTS

| | | | |
|---|---|---|---|
| WO | 2010039895 | A1 | 4/2010 |
| WO | 2012131927 | A1 | 10/2012 |

EFFICIENT SORTING IN A RELATIONAL DATABASE

BACKGROUND

The present invention relates to computing systems, and more particularly to relational database manipulation; for instance, the invention provides a method for sorting enumeration tables of a relational database.

Enumerations are sets of named ordinal values for qualitative classification that can be ordered in a meaningful sequence. As an example, for software applications managing job scheduling on computers, enumerations are used to qualify states of a job by corresponding object states, each state being one out of a predefined set of possible states {READY, COMPLETE, FAILED, SUBMITTED, . . . }. Each state is described as a character string. However, internally to a software application, each value may be associated for simplification, to simple enumeration variable name. For instance, if taking the one character string as internal variable, the READY state could be 'R', SUBMITTED 'S' and so on. These internal values which are used for programming purpose have no significance for the end user of a software application using them. However for displaying data of the application to the end user, for preparing understandable reports or any other case where an understandable presentation of the data of the application is needed, a full character string may be necessary and preferable in the language of the end-user or report reader. For instance, a end-user with English language will understand if the job is mentioned as 'READY' and the a end-user with Italian language will understand if the job is mentioned as 'PRONTO'. This implies that the internal value of the job state is transformed into a character string that is read in the locale of the user language. It is noted that the data manipulated in locale are character strings which can be sorted by alphabetic order. Enumeration values can be anything, even binary values, as long as they can be sorted in some way. Assuming the enumeration variable values are needed to be sorted for instance upon a command entered by end-user displaying the data of the application; as explained hereunder, for a typical software application, this request, according to prior art, is really costly to execute in terms of processing time and storage space, when the need for representing the enumeration variable values with character strings in the language of the end user goes along with sorting the character strings in an alphabetic order.

A typical software application using a relational database to store variable values, will use an additional independent table, the catalog, to store the character strings in different languages associated to the enumeration variable values. To prepare application variable values in an understandable way for the end-user, in the language of the end-user the application will have to translate the non-understandable enumeration internal variable values into corresponding character strings by reading them in the catalog table. To access the data on catalog relational databases, the application executes SQL queries. If the application needs to prepare the enumeration variable values sorted in the alphabetic order of their expression of the locale, a JOIN SQL statement is executed between the application data table and the catalog table. The reason for the JOIN on the two tables is that, the sorting in alphabetical order of the character strings of the catalog database must be done simultaneously with the corresponding enumeration variable values of the catalog database. A JOIN SQL operation combines two tables by generating all possible combinations of each row of the first table with all rows of the second table; it will require loading and comparing all (n) rows in the first table with all (m) rows in the second table with a process cost of n×m; this operation is thus very costly, specially when there are thousands objects to process. This has a strong impact on performance of the software applications, such as, for instance, job management applications scheduling hundred of thousands of jobs in a distributed computing environment.

It is needed to avoid the drawback illustrated above on a software application using SQL relational databases for data and catalog and preparing sorted character strings corresponding to enumeration values transformed using a locale. It is noted that much work in database-system technology has aimed at efficient implementation of JOIN because relational systems commonly call for JOIN SQL statements which remain anyhow very costly.

SUMMARY

In one or more aspects, a method is provided to compute a sorted list of enumeration values in a specific language, read from at least one relational database including at least one data table storing enumeration programming variable values and at least one catalog table storing an expression, in at least one language, of the enumeration programming variable values. The method includes: receiving a request for providing enumeration variable values including one list sorted in a specific order, of the values of a specific enumeration, in a specific language; sorting in the specific order, all the expressions in the specific language corresponding to the variable values of the specific enumeration read in a corresponding catalog table; determining if the sorted list of the specific enumeration expression values matches a list of the specific enumeration variable values sorted in the specific order in the same catalog table, and if so, creating a list of the specific enumeration variable values in the corresponding data table sorted in the specific order, the other requested enumeration variables being in the data table, skipping the following steps; if in the determining step the match was not found, and if the sorted list of the specific enumeration expressions values matches a list of the specific enumeration variable values sorted in the reverse order from the specific order in the same catalog table, creating a list of the specific enumeration variable values in the corresponding data table sorted in the reverse order from the specific order, the other requested enumeration variables being in the data table, skipping the following step; and if in any of the two preceding steps, the match was not found, creating a new table joined with the same catalog table and the data table containing the enumeration variable values and creating a list with the enumeration variable values read in the joined table sorted on the expressions of the specific enumeration variable values in the specific language, the other requested enumeration variables being in the joined table.

Systems and computer program products incorporating one or more aspects of the above-summarized method are also described and claimed herein.

BRIEF DESCRIPTION OF THE DRAWINGS

Embodiments of the present invention are described below, by way of example only, with reference to the drawings, in which.

DETAILED DESCRIPTION

Figure 1:
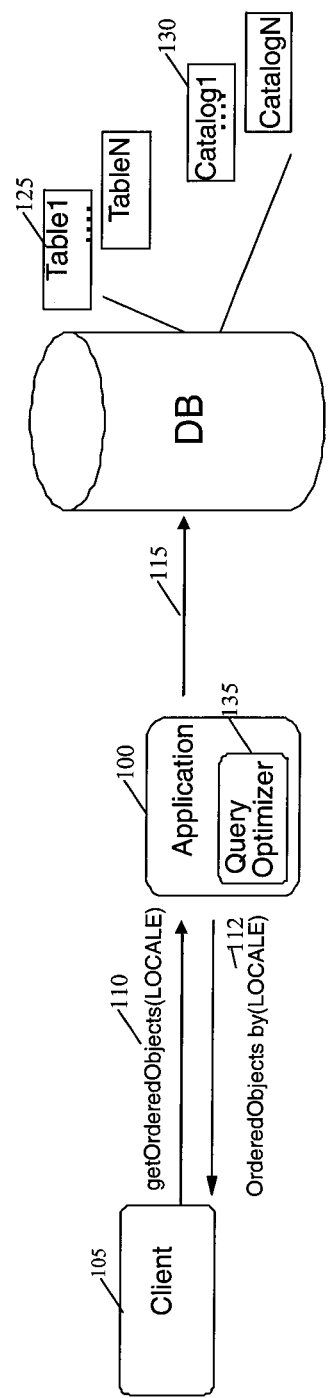
FIG. 1 shows one embodiment of a computing environment implementing one or more aspects of the present invention.

FIG. 1 shows one embodiment of a computing environment to implement a method according to one or more aspects of the present invention. Assuming an application (100) operating for instance on a server, uses a database (120) to store data in Table 1 (125), . . . Table N . . . And to store locale-dependent information in Catalog 1 (130) . . . Catalog N which describe inputs needed for translation of enumeration variable values into expressions understandable in a specific language for the end user of the application. This figure is an illustration only and the number of tables, catalogs are variable and independent of the concepts disclosed herein. The syntax of the request (high level programming) sent by the Client to the Application and QUERY (low level programming for accessing relational databases which are standardized today as SQL statements) are for illustration only. An SQL developer accesses the database by means of SQL statements like SELECT to access an element from one database table. However, there is often a further abstraction layer or API, that makes the task easier for developers (getOrderedObjects(LOCALE) being one example). The API allows the developers to work in their own domain rather than with a relatively low-level queries to access a relational database.

From the client application (105) a request is sent to the application for obtaining a list of objects ordered according to the values of an enumeration variable of the application. This request can be for displaying some results for the end-user. The request (110) getOrderedObjects(LOCALE) refers to a request for a list of objects, containing at least one enumeration variable, ordered according to the translation of enumeration variable values into expressions understandable in a specific language (LOCALE, given as a parameter) for the end user of the application, such translation being stored in the Catalog. In other words, the system gets a request for a list of objects. The method described is used as soon as:
  the requested objects contain at least one variable of enumeration type
  the enumeration type is not used as-is, but rather translated into a corresponding label by looking it up into a Catalog (e.g. for the purpose of presenting it to the user)
  the requested list of objects is sorted according to said label coming from the Catalog.

It is noted that one or more objects can be requested and the process if applied to one object in the rest of the description can apply also to more than one object in the same way. In the standard way to process the request of the client, the Application joins the Data tables (125) and the Catalog tables (130) to create a JOIN table, and sorts it as required (110). In one or more embodiments of the present invention, the application upon reception of the request, asks a new software component of the Application, a Query Optimizer (135), to generate a query. The Query Optimizer first decides which enumeration variable value sorting process will be applied. To determine the best strategy, the Query Optimizer reads the enumeration values from the data tables and the labels from the catalog tables (115) and computes a sort strategy that is then used to generate a query. It returns the ordered list 'OrderedObjects by(LOCALE)' (112) to the requester, for instance the Client application (105). It is noted that a variation could be that the ordering is entirely delegated to the Query Optimizer component which could prepare the ordered list, this choice does not change the global method for optimizing the sorting of enumeration variable expressed in one specific language.

The process of one embodiment, as explained in detail below in connection with FIG. 3, can produce faster and more efficient queries with respect to the traditional process of prior art which comprises a JOIN operation of data and catalog tables in any case, when a request for sorting (110) is to be processed.

Figure 2:
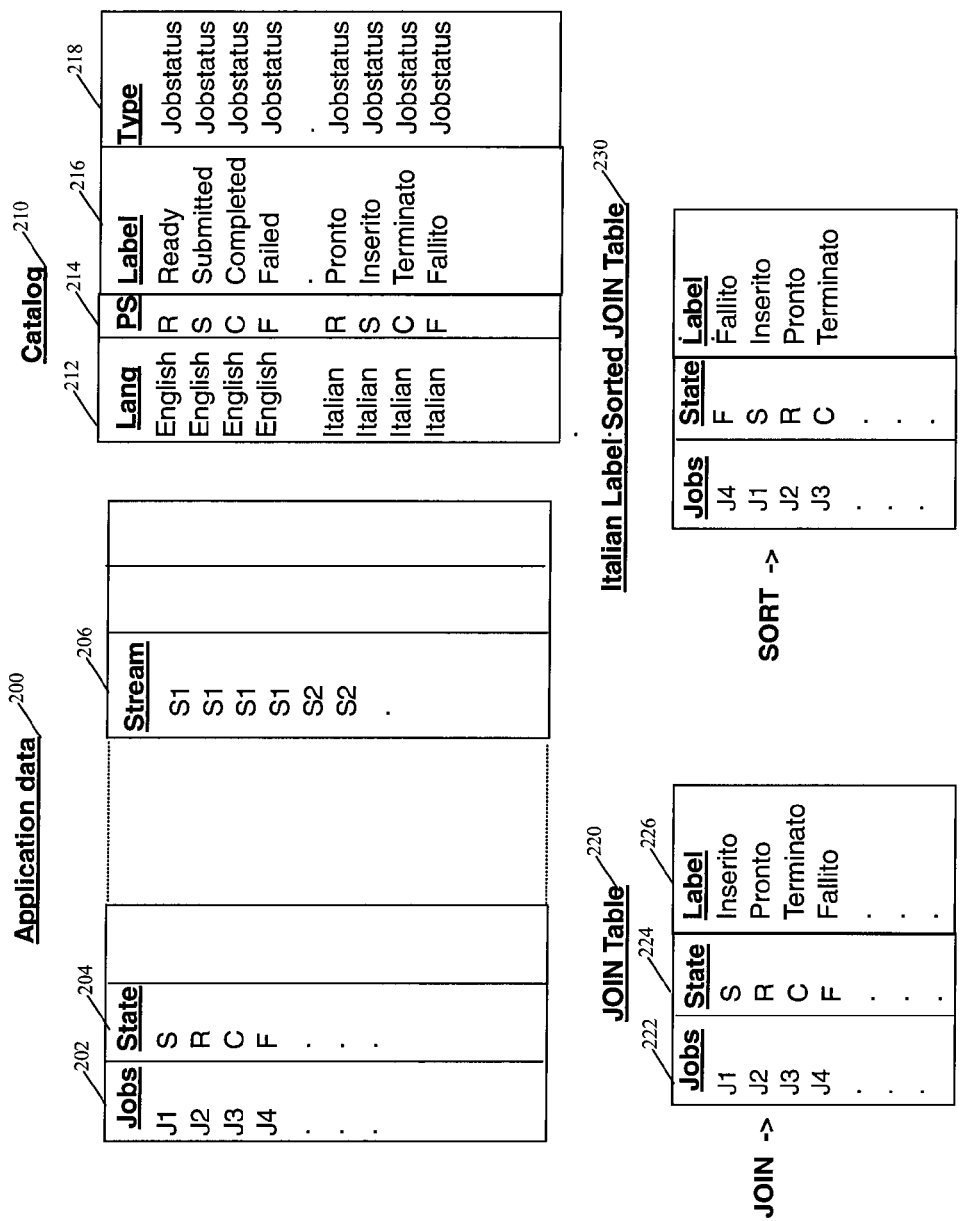
FIG. 2 is an illustration of a database table management for sorting an enumeration using locale according to prior art.

FIG. 2 is an illustration of the database table management for sorting an enumeration using a specified locale according to prior art. The software application which is, for instance, a job management application, uses a relational database for storing data as illustrated with the Application_data table (200). The table comprises at least one column (204) for the states of Jobs which are enumeration values. The variable used for the state of jobs managed by the software application is a character string of one letter; as computer programs are often written in English, we assume here, for example, that the value used is the initial of the English words for job states: "R" is used for a job which is Ready, "S" for job Submitted, "C" for Complete and "F" for Failed. The job management application maintains in the database column 202 the list of jobs which are managed; in column 204 the job management application maintains the corresponding enumeration variable value for each job. In this example, we focus on jobs J1, J2, J3 and J4.

Independently, a catalog database that the developer may have initially created (210), contains the character strings corresponding to the enumeration values for all supported different languages. The data for English language comprises the 4 rows in the catalog table having the word 'English' stored in Lang (for language) column 212. Each row of the locale for English language comprises at least in PS (Possible States) column 214 the enumeration values in a finite number, as it is for an enumeration, for a type which is job status (Jobstatus in column 218) and in Label column 216 the corresponding character string in English language which is a comprehensive expression in English. The comprehensive character string of the variable value "R" is "Ready". Similarly, those character strings are provided for each pair of enumeration value and supported language. For example, the comprehensive expression for the same variable value "R" is "Pronto" in Italian as it can be read in language Label column 216 for the row having 'Italian' in column 212 and the variable value "R" in PS column 214 of the possible states.

The enumeration that the method of the invention supports can be expressed in a specific language in the catalog database as a character string as with the example of job status (completed, failed etc. . . . ). When we order the expression it could be in the alphabetical order or, while respecting time or date or in any arbitrary order we may define. The same method applies to these other cases.

It is noted that the Application_data table and the catalog table may include one table each, as illustrated here, or more tables, one for each language for the catalog database for instance. In the same way each table may include more columns even if the simplified example of FIG. 2 is sufficient to describe the method of the prior art. Just as an example the Application_data can have one additional column 'Stream' (206) for storing the job stream ids for a set of jobs. This job stream variable is used by the exemplary job management application to manage jobs by group. Also the Catalog table can contain different enumeration variables, the one for the example of FIG. 2 being the job status so called 'State' variable in Application_data table so that the rows we consider in the Catalog table are associated to the enumeration variable 'Jobstatus' as mentioned in the Catalog table column 'Type' (218). Further rows in the catalog table could correspond to one 'Type' different from Job status. We may have in column Type in the Catalog table, 'EarlyAction': this enumeration variable could be needed to be sorted in alphabetic order in a specific language (see in one other example in the document): this enumeration variable indicates the actions to be accomplished on the job.

The job management application can always use the catalog database for finding one comprehensive value in a specific locale. It looks up the key (State=R) in the English rows of the catalog and finds the string 'Ready' or, in the Italian rows of the catalog and finds the string 'Pronto'. When the job management application needs to prepare records of the enumeration variable values at a point in time and their corresponding character string based expressions and to sort them in the alphabetic order of the character strings, a JOIN table is first to be dynamically built. The JOIN table (220) illustrated here, comprises at least the Jobs and State columns of the Application_data table and a column with the labels of corresponding state as found in the Catalog table. As a matter of fact, it is necessary, to first JOIN the Application_data table and the catalog table, and then perform the sort operation of the catalog labels on the JOIN table.

The SQL statements that a program uses to access the relational databases may be as follows:

SELECT "something" FROM "some table" WHERE "some condition may be specified to limit the number of data"

For instance:

SELECT (Jobs,State) FROM Application_data
WHERE (Application_data.Stream='S1')

which means:

SELECT columns named "Jobs" and "State" FROM all rows in a table named "Application_data" WHERE the value of a column named "Stream" is 'S1'.

for programming sorting of a table:
ORDER BY "specify to order the result according to some criteria"

Assuming the application prepares displaying the list of jobs and their state expressed in Italian and sorted in the alphabetic order of the possible job states; the application will use the Application_data (200) and Catalog (210) databases of FIG. 2 which both comprise a unique table and the following SQL statements to create the JOIN Table (220):

SELECT (Jobs, State) FROM Application_data
JOIN Catalog ON Application_Data.State=Catalog.PS
WHERE (Catalog.Lang='Italian')

These statements create the JOIN Table of FIG. 2 (220) which comprises the state corresponding value which are the corresponding labels in Italian language of the Catalog table. This JOIN table includes a first column (222) of job ids which are the enumeration variable values (J1, J2, J3 and J4) as it is already in column Jobs in the Application_data table; it comprises also a second column (224) of the job states which are the enumeration variable values (S, R, C, F) as it is already in the Application_data table. The third column (226) is comprises the labels read in the catalog table Label (216), these labels corresponding to the states read in the PS column (214) for the Italian language, that means for the rows in which Lang column (212) contains 'Italian'. To R State in the JOIN table is associated Label Pronto as read from the Catalog table; to S is associated Onserito, C Terminato and F Fallito.

Once the join table is ready, the application can order the rows according to the ascending alphabetical order of the labels (226) using the following SQL clause applied to the JOIN table:
ORDER BY Label ASC;
the result is illustrated with the sorted JOIN table (230) of FIG. 2 in which the rows of the Join table 220 have been sorted in alphabetic order of each label in Italian language in column 226 (Fallito, Inserito, Pronto and Terminato). The sorted JOIN table can be directly used for displaying to an Italian language user of the application, the different states of the jobs currently managed by the application, listed in the increasing alphabetical order of the character string describing in Italian language the job state values.

Figure 3:
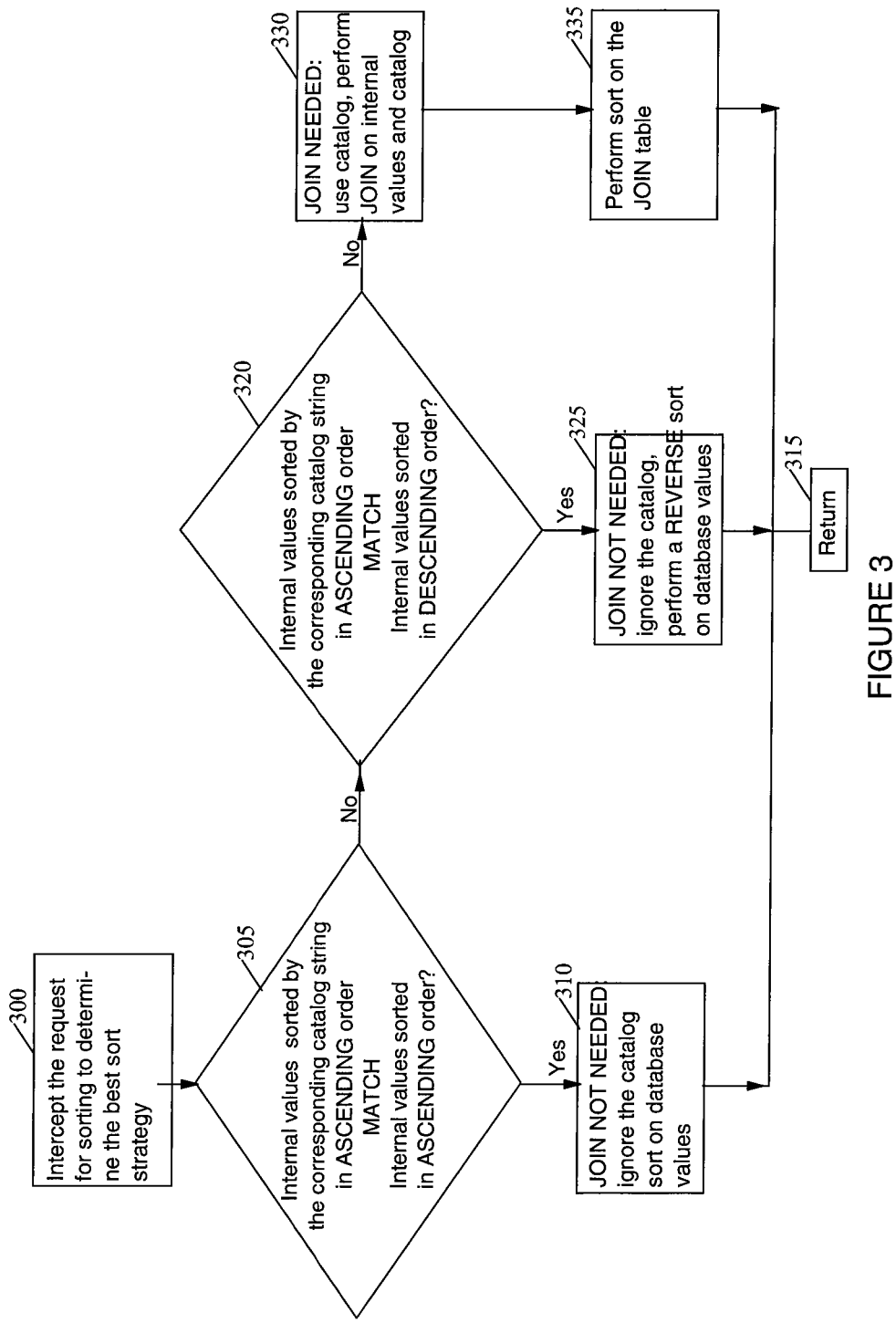
FIG. 3 is a flowchart of one embodiment of a method according to one or more aspects of the present invention.

FIG. 3 is a flowchart of a method according to one or more aspects of the present invention. According to one embodiment of the invention, to process a request for preparing a representation with character string according to a particular locale of the values of an enumeration variable, the sorting strategy is first decided.

An example of the implementation is an analysis system to decide for the sorting strategy, taking as input an OrdinalType class and a user Locale (i.e. language). It then retrieves a list of values corresponding to the internal representation of the input type and the corresponding translated versions from the catalog. If the input type is BooleanValue and the language is English, internally the values are 'Y' and 'N', corresponding to 'Yes' and 'No' in the catalog.

The system may generate the following 3 lists:
1. internal values sorted in ASCENDING order
2. internal values sorted in DESCENDING order
3. internal values sorted by the corresponding catalog string in ASCENDING order For example in the case of a BooleanValue we have these lists:
1. (N, Y)
2. (Y, N)
3. (N, Y) corresponding to the sorted list ('No', 'Yes')

Note that if the language is English the internal values sorted by the corresponding catalog string in ASCENDING order correspond to ('No', 'Yes') that is (N,Y): 1. Matches 3.

However if the language is German the internal values sorted by the corresponding catalog string in ASCENDING order correspond to ('Ja', 'Nein') that is (Y,N): 2. Matches 3.

The system then determines the optimal sorting strategy for each particular (enumeration type, locale) pair, as follows:

if list#3 is equal to list#1 then the strategy is "ignore the catalog (do not JOIN), sort on enumeration values"

if list#3 is equal to list#2 then the strategy is "ignore the catalog (do not JOIN), sort on enumeration values using an order opposite to that requested by the original sort operation (for example if a query has to be sorted in ASCENDING order on the catalog strings, then according to this strategy in order to obtain the desired result the actual query will be sorted on the enumeration values in DESCENDING order)"

otherwise the strategy is "use the catalog (JOIN the tables and perform a sort on the character string in the order requested for the end-user)".

In this simple example we have, for English locale list#3=list#1, so the strategy is "ignore the catalog (do not JOIN), sort on enumeration values".

In this simple example we have, for German locale list#3=list#2, so the strategy is "ignore the catalog (do not JOIN), sort on enumeration values using an order opposite to that requested by the original sort operation".

The entire system is dynamic because the sorting strategy depends on the type, locale (language) and on the actual content of the catalog table.

Taking a more complex example, assuming there exists an enumerated type named "EarlyAction" that has three values: 'A' (ABEND), 'C' (CONTINUE) and 'F' (CONFIRM). Let's take a look at the English catalog:

A→Abend
C→Continue
F→Confirm

In catalog order the list sorts as A, F, C. This does not match any "native" order so the strategy is "use catalog" and a JOIN will be used:

```
SELECT * FROM Application_data
JOIN Catalog on Application_data.EarlyAction= Catalog.PS
WHERE (Catalog.Lang='English' and Catalog.Type='EarlyAction')
ORDER BY Catalog.Label
```

Let's now consider the Italian catalog:
A→Fine anomala
C→Continua
F→Conferma

In catalog order the list sorts as F, C, A. This matches the reverse (DESCENDING) native order, so the best strategy is now "ignore the catalog (do not JOIN), sort on enumeration values using an order opposite to that requested by the original sort operation":

```
        SELECT * FROM Application_data
        ORDER BY Application_data.EarlyAction DESC
```

It can be seen that using this system, the same use query generates two entirely different SQL statements, and that by exploiting the actual values of the Italian catalog the second query has been optimized and will perform in an efficient way.

The flowchart of FIG. 3 starts with a first step (300) of intercepting the standard request in the application for building up a list of character strings of the values of an enumeration variable internal to the application of the Application_data database, ordered by the alphabetical order of the character strings corresponding to that value in one language locale stored in the Catalog database. The same applies to more than one enumeration value this does not change the description.

The sort strategy is then decided, it starts by collecting the list of internal enumeration values sorted by the corresponding catalog string in ASCENDING order: in the Catalog table of FIG. 1, the result is C, F, R, S if the locale of the request is English. The list of the internal enumeration values sorted in ASCENDING order is collected: in the Application_data table of FIG. 1, the result is C, F, R, S if the locale of the request is English. The two lists are compared (305) if the test result is positive, the strategy to execute the request above will be to ignore the JOIN and rather decide to sort directly the enumeration variable values (310) and to return (315) to the application for finalizing the execution of the request and replacing in the sorted enumeration values by the corresponding character string in the catalog database.

After the two lists are compared (305) if the test result is negative, the list of the internal enumeration values sorted in DESCENDING order is collected and compared (320) to the list of internal enumeration values sorted by the corresponding catalog string in ASCENDING order. If the test result is positive, the strategy to execute the request above will be to ignore the JOIN and rather decide to sort directly the enumeration variable values (325) and to return (315) to the application for finalizing the execution of the request and replacing in the sorted enumeration values by the corresponding character string in the catalog database.

If the result of the second test (320) of checking if the internal values sorted by the corresponding catalog string in ASCENDING order match the internal values sorted in DESCENDING order is negative, a JOIN is performed (330) on internal values and catalog (obtaining JOIN table, 220, of FIG. 2). Then a sort is performed (335) on the JOIN table (obtaining the sorted JOIN table, 230, of FIG. 2). Then, the process returns to the application, the sorted JOIN table content containing the result of the request.

It is noted that the flowchart describes a method executed when for a request for sorting a specific enumeration. If the request is on more than one enumeration (more than one programming Object of the getOrderedObject in the program), the flowchart is repeated for each enumeration (each Object).

Figure 4:
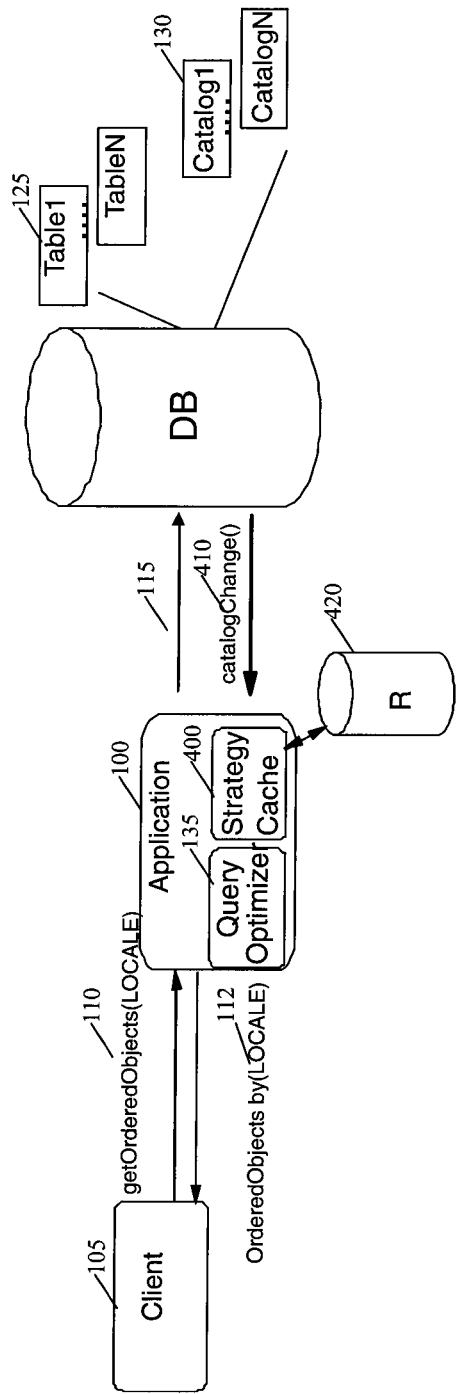
FIG. 4 shows another embodiment of a computing environment implementing one or more aspects of the present invention.

FIG. 4 shows a computing environment for a method according to another embodiment of the present invention. In this embodiment, the application may be enriched with a second function which may be implemented as a second software component, the 'Strategy Cache' component (400) for the application (100). The Strategy Cache component which is also related to the application, is a manager for storing sorting strategy computed for a specific request and according to the content in the Catalog. As explained in connection with FIG. 3, a strategy for sorting is computed (305, 320) before any sorting is performed to answer a request for sorting the expression describing in one given language, an enumeration value variable in an alphabetic order (110) getOrderedObjects(LOCALE). This strategy is computed by the Query Optimizer for each request for sorting and may change when the catalog changes. When the Query Optimizer computes the sort strategy some information are read from the catalog table, namely the list of labels for a specified enumeration type and language. Any change of this data needs to be monitored: if a label referred to a value of a certain type changes in the catalog, the strategy for this type must be recalculated, then, the sort strategy already computed by the Query Optimizer for one request for a certain type cannot be used anymore, and the sort strategy already computed by the Query Optimizer for one request cannot be used anymore. The Strategy Cache stores the sort strategy that had been computed previously by the Query Optimizer in a repository (420), wherein the strategy may be encoded using a pair of (key, value) where the value is the result of the computing of the best strategy by the Query Optimizer: any value are possible, it could be "1" if the result is 'sort on database values' (310) or "2" for 'perform a REVERSE sort on database value' (325) or "3" for create JOIN table and perform sort on the JOIN table' (330, 335). The key is associated to a request so that, request that should have the same output, have the same key. The Query Optimizer sends the strategy computed for a given request to the Strategy Cache which stores this information in the repository.

Note that a repository is one sort of persistent storage for a computer; and the same method applies to any other type of persistent storage.

The Strategy Cache maintains the information in the Repository accurate. If the Catalog is updated for a certain type, the strategy for that type is no more valid for the request and the Strategy Cache component throw all the information relative to the type away, so that when the Query Optimizer needs to reuse a strategy for a request, it recomputes the strategy and re-give the information to the Strategy Cache which will store it in the Repository. The Strategy Cache is advised of any change in the Repository by a database TRIGGER, which is a mechanism provided by relational databases to act when some change occurs. A CatalogChange( ) (410) is received by the Strategy Cache which thus throws all the information away from the repository and the Query Optimizer will have to recomputed the strategy and give it for storing to the Strategy Cache component.

The repository includes a pair of information which is an information used to recognize a specific request and an used to recognize a result in the match computed to decide which sort strategy to apply. As an example, any signature of the request is valid; any variable for the test result is valid.

Figure 5:
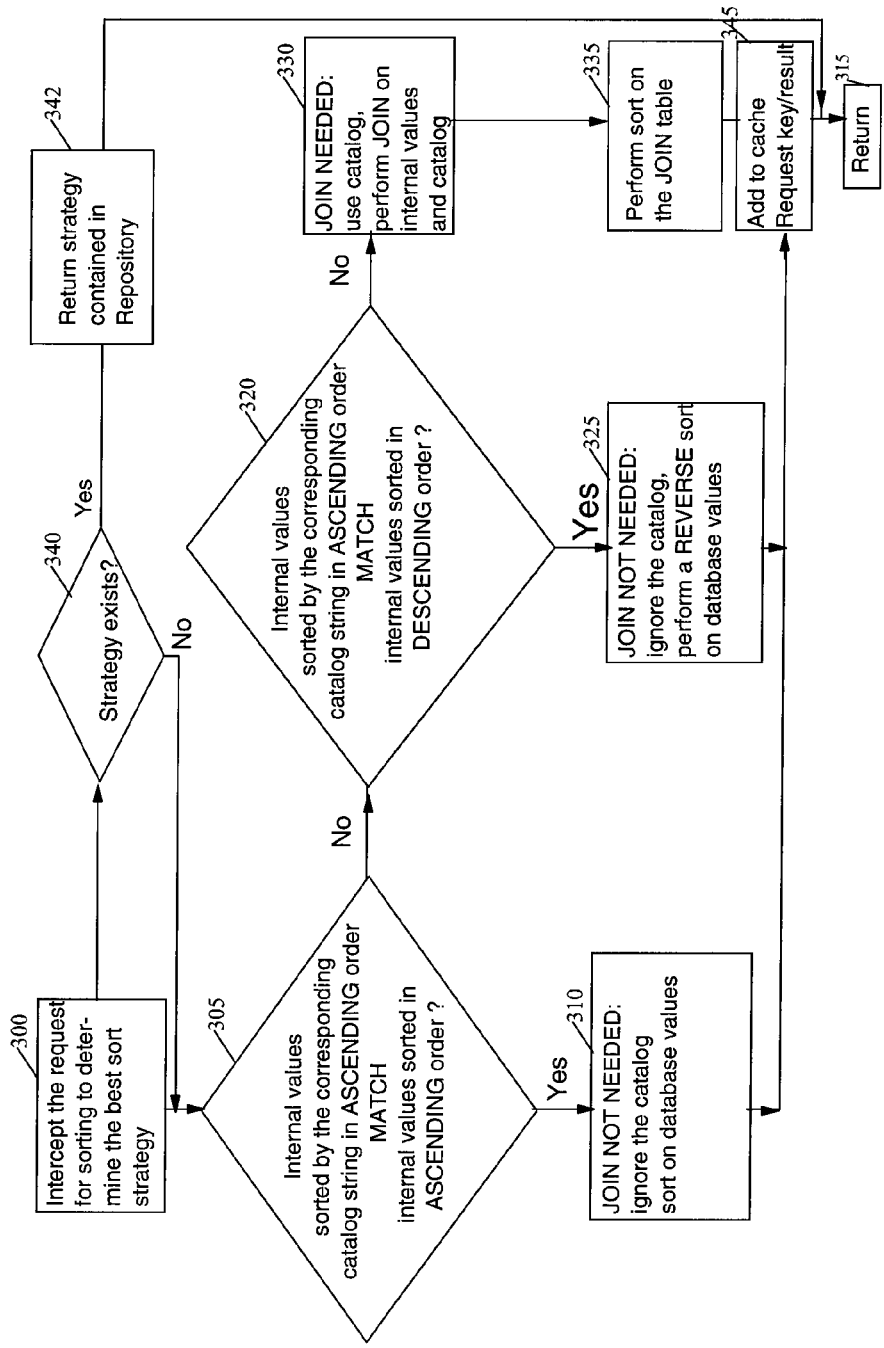
FIG. 5 is a flowchart of another embodiment of a method according to one or more aspects of the present invention.

FIG. 5 is a flowchart of a method according to another embodiment of the present invention. Optional steps (340, 342, 345) corresponding to this second embodiment have been added compared to the flowchart of FIG. 3. The sort strategy that is computed by the flow illustrated in FIG. 3 can optionally be saved in a persistent repository (420). If the repository is used, then, when a sort is needed, the repository is first checked (test 340) to see if a sort strategy for the specified (enumeration type, user language) pairs is found, and if so (answer "Yes" to test 340) the rest of the flow (i.e. all steps starting from and including step 305) is not executed.

If the repository is used, it can also be populated at application startup. If so, when the application starts it generates all possible (enumeration type, user language) pairs that the application needs to support, generates the proper sort strategy for each of them and saves it in the repository.

If the repository is used, it can also be populated in a more dynamic way. If so, the application waits until a query with a sort clause (110) is issued, then checks whether the repository exists and is working and:

if the repository exists, the application uses it to retrieve the sort strategy and returns;

if the repository does not exist, the application creates it and computes and adds to it just the entry for the specified (enumeration type, user language) pair.

The application can also decide to monitor the catalog for changes. If the catalog is changed, then the application clears the sort strategy repository to make sure it starts from scratch next time it is used. This can be implemented for example with a database TRIGGER (410) on the catalog table.

Note that although the description and examples deals with certain specific objects, the invention applies to all kind of types that consist of a set of localizable values. Enumerated type could be generalized to any data type that cannot be directly displayed to the user, but requires "translate into string" step the "translate into string" step is implemented by looking up into a table that contains pairs of (value, string).

The optimization described applies first on how often we are able to apply the optimization. The answer depends a lot on the enumeration values, the length of the enumeration and the catalog language. For an application performing job scheduling in a distributed computing environment, the statistics collected for a few western languages show that 35% of the total cases can be optimized. This may vary also with the applications. The optimization described applies also on how much we gain from using the optimization. It depends primarily on the table sizes; based on typical values as found in the literature, saving a costly JOIN operation may improve performance by 10 times (i.e. 1000%) or more but lots of factors will heavily influence what is seen in practice.

Using a repository will avoid re-performing the test for deciding the best strategy when a same request is received for a same enumeration.

Those skilled in the art will note that advantageously, methods, systems, and computer program products are provided herein for computing a sorted list of enumeration values in a specific language, read from at least one relational database including at least one data table storing enumeration programming variable values and at least one catalog table storing an expression, in at least one language, of the enumeration programming variable values. The method includes: receiving a request for providing enumeration variable values including one list sorted in a specific order, of the values of a specific enumeration, in a specific language; sorting in the specific order, all the expressions in the specific language corresponding to the variable values of the specific enumeration read in a corresponding catalog table; determining if the sorted list of the specific enumeration expression values matches a list of the specific enumeration variable values sorted in the specific order in the same catalog table, and if so, creating a list of the specific enumeration variable values in the corresponding data table sorted in the specific order, the other requested enumeration variables being in the data table, and skipping the following steps; if in the determining step the match was not found, and if the sorted list of the specific enumeration expression values matches a list of the specific enumeration variable values sorted in the reverse order from the specific order in the same catalog table, creating a list of the specific enumeration variable values in the corresponding data table sorted in the reverse order from the specific order, the other requested enumeration variables being in the data table, skipping the following step; and if any of the two proceeding steps, the match was not found, creating a new table joined with the same catalog table and the data table containing the enumeration variable values and creating a list with the enumeration variable values read in the joined table sorted on the expressions of the specific enumeration variable values in the specific language the other requested enumeration variables being in the joined table.

The method may further comprise: saving in a persistent storage the result of matches performed in the preceding steps associated to a signature of the request; repeating the receiving step for a further request; reading the match result in the persistent storage for this further request; and if the match is found in the persistent storage, skipping the match computation, and executing directly the creation of a sorted list of the other steps of the method.

The method may also comprise initially: computing the match result for all possible enumeration variables and languages in the at least one catalog table; performing the step of saving in a persistent storage the results of matches computed in the preceding step; and the method further comprising, after the receiving step: reading the match result in the persistent storage means for this request; and if the match is found in the persistent storage, skipping the match computation and executing directly the creation of the sorted list of the other steps of the method.

Upon reception of an event, the method may also include advising for a change in the at least one catalog table applying to at least one enumeration, refreshing the content of the persistent storage by deleting the computed match results for all the requests using the enumerations concerned by the change and re-computing the matches with the new catalog values for the enumeration concerned by the change.

In the method, the expression in the at least one catalog table may be a character string and wherein the ordering of the expression may be an ordering done in the alphabetic order.

As noted, the method may be implemented as a computer program product comprising programming code instructions for executing the steps of the method when the program is executed on a computer.

A system is also described comprising a memory and processor adapter for carrying out the method as claimed.

The invention claimed is:

1. A method to compute a sorted list of enumeration values in a specific language, read from at least one relational database including at least one data table storing enumeration programming variable values and at least one catalog table storing an expression, in at least one language, of the enumeration programming variable values, the method comprising:
receiving a request for providing enumeration variable values including one list sorted in a specific order, of the values of a specific enumeration, in a specific language;
sorting in the specific order, all the expressions in the specific language corresponding to the variable values of the specific enumeration read in a corresponding catalog table;
determining if the sorted list of the specific enumeration expression values matches a list of the specific enumeration variable values sorted in the specific order in the same catalog table, and if so, creating a list of the specific enumeration variable values in the corresponding data table sorted in the specific order, the other requested enumeration variables being in the data table, skipping the following steps;
if in the determining step the match was not found, and if the sorted list of the specific enumeration expressions values matches a list of the specific enumeration variable values sorted in the reverse order from the specific order in the same catalog table, creating a list of the specific enumeration variable values in the corresponding data table sorted in the reverse order from the specific order, the other requested enumeration variables being in the data table, skipping the following step; and
if in any of the two preceding steps, the match was not found, creating a new table joined with the same catalog table and the data table containing the enumeration variable values and creating a list with the enumeration variable values read in the joined table sorted on the expressions of the specific enumeration variable values in the specific language the other requested enumeration variables being in the joined table.

2. The method of claim 1, further comprising:
saving in a persistent storage the result of matches obtained in the preceding steps associated to a signature of the request;
repeating the receiving for a further request;
reading the match result in the persistent storage for this further request; and
if the match is found in the persistent storage, skipping match computation and executing directly the creation of the sorted list.

3. The method of claim 1, further comprising initially:
computing the match result for all possible enumeration variables and languages in the at least one catalog table; and
saving in a persistent storage the results of matches computed in the preceding step;
the method further comprising, after the receiving, reading the match result in the persistent storage for this request;
if the match is found in the persistent storage, skipping the match computation and executing directly the creation of the sorted list.

4. The method of claim 3, wherein upon reception of an event advising for a change in the at least one catalog table applying to at least one enumeration, refreshing the content of the persistent storage by deleting the computed match results for all the requests using the enumerations concerned by the change and re-computing the matches with the new catalog values for the enumeration concerned by the change.

5. The method of claim 1, wherein the expression in the at least one catalog table is a character string and wherein the ordering of the expression is an ordering done in the alphabetic order.

6. A system for computing a sorted list of enumeration values in a specific language, read from at least one relational database including at least one data table storing enumeration programming variable values and at least one catalog table storing an expression, in at least one language, of the enumeration programming variable values, the system comprising:
a memory; and
a processor communicatively coupled to the memory, wherein the system performs a method comprising:
receiving a request for providing enumeration variable values including one list sorted in a specific order, of the values of a specific enumeration, in a specific language;
sorting in the specific order, all the expressions in the specific language corresponding to the variable values of the specific enumeration read in a corresponding catalog table;
determining if the sorted list of the specific enumeration expression values matches a list of the specific enumeration variable values sorted in the specific order in the same catalog table, and if so, creating a list of the specific enumeration variable values in the corresponding data table sorted in the specific order, the other requested enumeration variables being in the data table, skipping the following steps;

if in the determining step the match was not found, and if the sorted list of the specific enumeration expressions values matches a list of the specific enumeration variable values sorted in the reverse order from the specific order in the same catalog table, creating a list of the specific enumeration variable values in the corresponding data table sorted in the reverse order from the specific order, the other requested enumeration variables being in the data table, skipping the following step; and if in any of the two preceding steps, the match was not found, creating a new table joined with the same catalog table and the data table containing the enumeration variable values and creating a list with the enumeration variable values read in the joined table sorted on the expressions of the specific enumeration variable values in the specific language the other requested enumeration variables being in the joined table.

7. The system of claim 6, further comprising:
saving in a persistent storage the result of matches obtained in the preceding steps associated to a signature of the request;
repeating the receiving for a further request;
reading the match result in the persistent storage for this further request; and
if the match is found in the persistent storage, skipping match computation and executing directly the creation of the sorted list.

8. The system of claim 6, further comprising initially:
computing the match result for all possible enumeration variables and languages in the at least one catalog table; and
saving in a persistent storage the results of matches computed in the preceding step;
the method further comprising, after the receiving,
reading the match result in the persistent storage for this request;
if the match is found in the persistent storage, skipping the match computation and executing directly the creation of the sorted list.

9. The system of claim 8, wherein upon reception of an event advising for a change in the at least one catalog table applying to at least one enumeration, refreshing the content of the persistent storage by deleting the computed match results for all the requests using the enumerations concerned by the change and re-computing the matches with the new catalog values for the enumeration concerned by the change.

10. The system of claim 6, wherein the expression in the at least one catalog table is a character string and wherein the ordering of the expression is an ordering done in the alphabetic order.

11. A computer program product for computing a sorted list of enumeration values in a specific language, read from at least one relational database including at least one data table storing enumeration programming variable values and at least one catalog table storing an expression, in at least one language, of the enumeration programming variable values, the computer program product comprising:
a computer-readable storage medium having program instructions embodied therewith, the program instructions being executable by a processor to cause the processor to perform a method comprising:
receiving a request for providing enumeration variable values including one list sorted in a specific order, of the values of a specific enumeration, in a specific language;
sorting in the specific order, all the expressions in the specific language corresponding to the variable values of the specific enumeration read in a corresponding catalog table;
determining if the sorted list of the specific enumeration expression values matches a list of the specific enumeration variable values sorted in the specific order in the same catalog table, and if so, creating a list of the specific enumeration variable values in the corresponding data table sorted in the specific order, the other requested enumeration variables being in the data table, skipping the following steps;
if in the determining step the match was not found, and if the sorted list of the specific enumeration expressions values matches a list of the specific enumeration variable values sorted in the reverse order from the specific order in the same catalog table, creating a list of the specific enumeration variable values in the corresponding data table sorted in the reverse order from the specific order, the other requested enumeration variables being in the data table, skipping the following step; and
if in any of the two preceding steps, the match was not found, creating a new table joined with the same catalog table and the data table containing the enumeration variable values and creating a list with the enumeration variable values read in the joined table sorted on the expressions of the specific enumeration variable values in the specific language the other requested enumeration variables being in the joined table.

12. The computer program product of claim 11, further comprising:
saving in a persistent storage the result of matches obtained in the preceding steps associated to a signature of the request;
repeating the receiving for a further request;
reading the match result in the persistent storage for this further request; and
if the match is found in the persistent storage, skipping match computation and executing directly the creation of the sorted list.

13. The computer program product of claim 11, further comprising initially:
computing the match result for all possible enumeration variables and languages in the at least one catalog table; and
saving in a persistent storage the results of matches computed in the preceding step;
the method further comprising, after the receiving,
reading the match result in the persistent storage for this request;
if the match is found in the persistent storage, skipping the match computation and executing directly the creation of the sorted list.

14. The computer program product of claim 13, wherein upon reception of an event advising for a change in the at least one catalog table applying to at least one enumeration, refreshing the content of the persistent storage by deleting the computed match results for all the requests using the enumerations concerned by the change and re-computing the matches with the new catalog values for the enumeration concerned by the change.

15. The computer program product of claim 11, wherein the expression in the at least one catalog table is a character string and wherein the ordering of the expression is an ordering done in the alphabetic order.

\* \* \* \* \*